United States Patent
Bräutigam et al.

(10) Patent No.: US 12,240,373 B2
(45) Date of Patent: Mar. 4, 2025

(54) HOLDING ELEMENT FOR HOLDING A COMPONENT TO BE SECURED, AND HOLDING SYSTEM WITH SUCH AN ELEMENT

(71) Applicant: ILLINOIS TOOL WORKS INC., Glenview, IL (US)

(72) Inventors: Martina Bräutigam, Weikersheim (DE); Johann Stein, Grünbach (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 548 days.

(21) Appl. No.: 17/604,951

(22) PCT Filed: Apr. 23, 2020

(86) PCT No.: PCT/US2020/029429
§ 371 (c)(1),
(2) Date: Oct. 19, 2021

(87) PCT Pub. No.: WO2020/219617
PCT Pub. Date: Oct. 29, 2020

(65) Prior Publication Data
US 2022/0176874 A1    Jun. 9, 2022

(30) Foreign Application Priority Data

Apr. 25, 2019   (DE) .................. 10 2019 110 701.6

(51) Int. Cl.
*B60Q 1/26* (2006.01)
*F16B 5/02* (2006.01)
*F16B 33/00* (2006.01)

(52) U.S. Cl.
CPC .......... *B60Q 1/2626* (2013.01); *F16B 5/0233* (2013.01); *F16B 33/004* (2013.01)

(58) Field of Classification Search
CPC ... B60Q 1/2626; B60Q 1/2642; F16B 5/0233; F16B 33/004; F16B 37/043
See application file for complete search history.

(56) References Cited

U.S. PATENT DOCUMENTS

| | | | |
|---|---|---|---|
| 5,423,646 A | 6/1995 | Gagnon | |
| 10,557,488 B2 * | 2/2020 | Bräutigam | ............ F16B 5/0233 |

(Continued)

FOREIGN PATENT DOCUMENTS

| | | |
|---|---|---|
| CA | 3004975 A | 2/2019 |
| CN | 101356371 A | 1/2009 |

(Continued)

OTHER PUBLICATIONS

PCT, International Preliminary Report on Patentability No. PCT/US2020/029429; date of issuance Sep. 28, 2021, 6 pages.

*Primary Examiner* — Matthew R McMahon
(74) *Attorney, Agent, or Firm* — THOMPSON HINE LLP

(57) ABSTRACT

A holding element for holding a component to be secured includes: a base region with a first receiving and holding region for an elongate fixing element, a second receiving and holding region for the component, and a first hollow cylindrical engagement region; a spacer element with a spacer surface and a second hollow cylindrical engagement region in engagement with the first hollow cylindrical engagement region; and a sealing element, of a softer material than the spacer element, and having a hollow insertion region, wherein the insertion region has an inner round casing surface configured to bear against the elongate fixing element all around when the fixing element is secured in the holding element and thus seal against wet or dirt, wherein the distance from the spacer surface to the base region can be adjusted.

19 Claims, 2 Drawing Sheets

(56) References Cited

U.S. PATENT DOCUMENTS

| | | | | |
|---|---|---|---|---|
| 11,111,949 | B2 * | 9/2021 | Bräutigam | ............. B60Q 1/045 |
| 11,560,912 | B2 * | 1/2023 | Wolf | ..................... F16B 5/0233 |
| 2018/0172043 | A1 | 6/2018 | Bräutigam | |
| 2018/0298936 | A1 * | 10/2018 | Bräutigam | ........... B60Q 1/0686 |

FOREIGN PATENT DOCUMENTS

| | | | | |
|---|---|---|---|---|
| CN | 105324582 | A | 2/2016 | |
| DE | 2459544 | A1 * | 7/1976 | ........... B60Q 1/2626 |
| DE | 202007002595 | U1 | 10/2007 | |
| DE | 202010002447 | U1 | 7/2010 | |
| DE | 202010008192 | U1 | 11/2010 | |
| DE | 102009024529 | A1 * | 12/2010 | ............. F16B 37/043 |
| DE | 102009024531 | A1 * | 12/2010 | ............. F16B 37/043 |
| DE | 102012202053 | A1 | 8/2013 | |
| DE | 102015103491 | A1 * | 8/2016 | ............. F16B 37/00 |
| DE | 102018108830 | A1 | 10/2018 | |
| DE | 102018211785 | A1 * | 1/2020 | ........... B60Q 1/2642 |
| DE | 102021100676 | A1 * | 7/2021 | ............. F16B 5/0233 |
| EP | 1136707 | A2 | 9/2001 | |
| EP | 3194795 | B1 * | 12/2019 | ............. F16B 37/04 |
| WO | WO-2016043854 | A1 * | 3/2016 | ............. F16B 37/04 |
| WO | WO 2016126284 | | 8/2016 | |

* cited by examiner

HOLDING ELEMENT FOR HOLDING A COMPONENT TO BE SECURED, AND HOLDING SYSTEM WITH SUCH AN ELEMENT

TECHNICAL FIELD

The invention relates to a holding element for holding a component to be secured, in particular on a vehicle, and to a holding system with a holding element of this type.

BACKGROUND

Vehicle parts, such as brake lights, are secured on the components of vehicles (for example, vehicle body parts) by way of holding elements of this type.

In order to secure vehicle parts on a vehicle, for example, simple systems are known which are implemented by means of screws which are introduced into a thread and are brought into engagement with the latter. Said systems have the disadvantage, however, that the spacing from the vehicle part to be fastened to the vehicle can be adjusted only poorly by way of simple systems of this type.

For this purpose, more complex fixing elements and fixing systems are known, in the case of which, for example, first and second securing means are provided. Here, the first securing means is attached to the vehicle part and the second securing means is attached to the vehicle body part. Furthermore, there is an engagement in some way between the first and the second securing means. The spacing between the first and second securing means and therefore the spacing between the vehicle part to be secured and the vehicle body part can be adjusted by means of a threaded connection.

In the case of complex systems of this type, however, there is a problem in so far as a sufficient seal with respect to the surroundings is not ensured, with the result that moisture can penetrate into the vehicle.

SUMMARY

Proceeding from the described prior art, the invention is based on the object of specifying a holding element and a holding system which make effective tolerance compensation and a reliable seal possible in the case of a simple assembly.

The solution according to the invention consists in configuring a holding element for holding a component to be secured, which holding element comprises the following: a base region with a first receiving and holding region for an elongate fixing element, a second receiving and holding region for a component to be secured, and a first hollow cylindrical engagement region; a spacer element with a spacer surface and a second hollow cylindrical engagement region which is in engagement with the hollow cylindrical engagement region of the base region; and a sealing element which consists of a softer material than the spacer element, wherein the sealing element has a hollow, preferably elongate insertion region which is inserted in or formed on the first hollow cylindrical engagement region of the base region, wherein the insertion region has an inner round casing surface which is configured to bear against the elongate fixing element all around when the fixing element is secured in the holding element and thus seal against wet or dirt.

The object is achieved in a satisfactory way by way of the holding element according to the invention.

By way of interaction of the first hollow cylindrical engagement region of the base region with the second hollow cylindrical engagement region of the spacer element, the spacing of the spacer surface of the spacer element from the base region can be adjusted, which base region holds the component to be secured in its second receiving and holding region.

That region of the component to be secured which is received and held by the second receiving and holding region is preferably of at least substantially two-dimensional configuration.

The sealing element (in particular, the elongate insertion region) bears with its inner (round) casing surface all around against the elongate fixing element (when the fixing element is secured in the holding element), with the result that a reliable seal against wet or dirt is made possible. In this way, in particular, a reliable (radial) seal between the fixing element and the base region is achieved.

The elongate insertion region of the sealing element can be configured in such a way that it can be introduced into the first hollow cylindrical engagement region of the base region, and then seals against wet or dirt when assembled with the elongate fixing element. As an alternative to this, however, it is also conceivable that the elongate insertion region is formed directly on the first hollow cylindrical engagement region of the base region (or on the spacer element depending on the embodiment). For example, a multiple component injection molding method, in particular a two component injection molding method, is appropriate to this end.

In accordance with one advantageous development of the invention, the first receiving and holding region has an opening with an internal thread, wherein an outer thread radius is defined by a thread base of the internal thread, and wherein the inner round casing surface has an inner diameter which is smaller than the outer thread radius.

Therefore, the inner round casing surface is of smaller dimensions than the outer thread radius of the internal thread, with which the fixing element comes into engagement in its assembled state. As a consequence, the inner diameter of the casing surface is also smaller than the outer diameter of the elongate fixing element, and therefore ensures a reliable seal.

As an alternative to this, however, it would also be conceivable that, instead of a thread, a multiplicity of grooves are provided, into which a corresponding fixing element (rivet) latches. It goes without saying that the size ratios would then also have to be transferred correspondingly to the grooves, with the result that a reliable seal can take place. If the first receiving and holding region has a thread, the elongate fixing element is preferably a screw.

In accordance with one advantageous development of the invention, the sealing element has an axial overhang at an inner periphery of a radial contact surface which rests at least in regions on the spacer surface.

The sealing element rests with its radial contact surface on the spacer surface of the spacer element. If the component to be secured is secured on the vehicle (for example, vehicle body part), the radial contact surface of the sealing element lies between the spacer surface of the spacer element and the vehicle body part. This construction prevents it being possible for moisture to penetrate into the vehicle.

The axial overhang has the advantage that the sealing element thus projects somewhat in the direction of the vehicle body part. Here, the axial overhang ensures that the sealing action of the holding element is improved.

In accordance with one advantageous development of the invention, the base region, the spacer element and the sealing element are made of plastic, wherein the sealing element is preferably made of a thermoplastic elastomer.

This has the advantage that the elements can be manufactured easily, and that the sealing element can fulfill its sealing function.

In accordance with one advantageous development of the invention, the second receiving and holding region is configured at least substantially as a clamp with a first leg and a second leg and has a main extension direction.

As a result of this construction, rapid securing of the component to be secured in the second receiving and holding region is possible.

The two legs extend at least substantially parallel to the main extension direction.

In accordance with one advantageous development of the invention, the first hollow cylindrical engagement region extends from the first leg orthogonally to the main extension direction of the second receiving and holding region, wherein the first receiving and holding region extends orthogonally from the second leg.

In accordance with one advantageous development of the invention, the first hollow cylindrical engagement region and the first receiving and holding region are arranged relative to each other such that an elongate fixing element can be introduced through the sealing element, the spacer element and the base region up to the first receiving and holding region.

That is to say, the first hollow cylindrical engagement region and the first receiving and holding region have a common rotational axis.

In accordance with one advantageous development of the invention, the second receiving and holding region has an insertion region and a latching device.

In accordance with one advantageous development of the invention, the latching device and the insertion region are arranged at opposite ends in the extension direction of the second receiving and holding region.

By way of the latching device, it is possible to move the component to be secured into the desired position before the actual assembly on the vehicle. For example, a bore in the component to be secured is then oriented with respect to the base region (more precisely, the first hollow cylindrical engagement region), the spacer element (more precisely, the second hollow cylindrical engagement region thereof) and the sealing element (more precisely, the elongate insertion region thereof) in such a way that the fixing element can be introduced through them as far as the first receiving and holding region.

In accordance with one advantageous development, the insertion region comprises an insertion aid, and the latching device comprises a recess.

The insertion aid serves to make it possible for the component to be secured to be introduced into the second receiving and holding region without great centering work. This can be, for example, a widened portion of the two legs which is funnel-shaped in cross section.

The recess serves as a simple possibility to come into engagement with the component to be secured. To this end, the component to be secured can have, for example, an associated protuberance or an overhang and can be formed in such a way that it comes into engagement with the recess when the component to be secured is pushed (completely) into the second receiving and holding region.

In accordance with one advantageous development of the invention, the second hollow cylindrical engagement region of the spacer element has an internal thread, and the first hollow cylindrical engagement region of the base region has an external thread.

It goes without saying that it would also be conceivable in this context that the first hollow cylindrical engagement region of the base region has an internal thread and the second hollow cylindrical engagement region of the spacer element correspondingly has an external thread. Here, the sealing element, if it is formed, for example, by means of a two component injection molding method, is formed correspondingly on the part with an external thread.

In accordance with one advantageous development of the invention, the distance from the spacer surface to the base region is adjusted by rotating the spacer element in the hollow cylindrical engagement region of the base region.

That is to say, the internal thread and the external thread are rotated relative to one another in such a way that the distance from the spacer surface to the base region is changed.

In accordance with one advantageous development of the invention, the spacer surface has a preferably at least substantially circular recess in which the radial contact surface of the sealing element is received.

This has the advantage that the radial contact surface of the sealing element lies on the spacer surface in a centered manner. Moreover, it is thus ensured that the sealing element assumes the position which is required for sealing.

In accordance with one advantageous development, the component to be secured is a rear light or tail light of a vehicle.

It goes without saying that it is also conceivable in this context that the component to be secured is another component which is different than a rear light and is to be secured on the vehicle.

Moreover, the solution according to the invention consists in specifying a holding system for holding a component to be secured, wherein the holding system comprises the following: a holding element as claimed in any of claims 1 to 14; and an elongate fixing element which is inserted through the sealing element, the spacer element and the base region and is in engagement with the first receiving and holding region; wherein the inner round casing surface has an inner diameter which is smaller than an outer diameter of the elongate fixing element.

Therefore, the holding system describes the complete system for holding a component to be secured (for example, a rear light) on the vehicle, in particular on the vehicle body part.

It goes without saying that all the advantages and features which are described with regard to the holding elements can be transferred directly to the holding system.

As a consequence, the distance from the spacer surface to the base region can be adjusted, to be precise, for example, by rotating the spacer element relative to the base region.

As has already been described, the spacer element can be capable of being rotated by way of the second hollow cylindrical engagement region (for example, internal thread) relative to the first hollow cylindrical engagement region of the base region (for example, external thread). The distance of the component to be secured from the vehicle can thus be adjusted.

Since the sealing element or its elongate insertion region has an inner diameter which is smaller than the outer diameter of the elongate fixing element, the sealing element bears securely all around on the outside against the elongate fixing element, with the result that a secure and reliable seal against wet or dirt is made possible. In this way, in particular, a secure (radial) seal between the fixing element and the base region is achieved.

BRIEF DESCRIPTION OF THE DRAWINGS

In the following text, the invention will be described in greater detail on the basis of the description of exemplary embodiments with reference to the appended drawings.

In the drawings.

DETAILED DESCRIPTION

Figure 1:
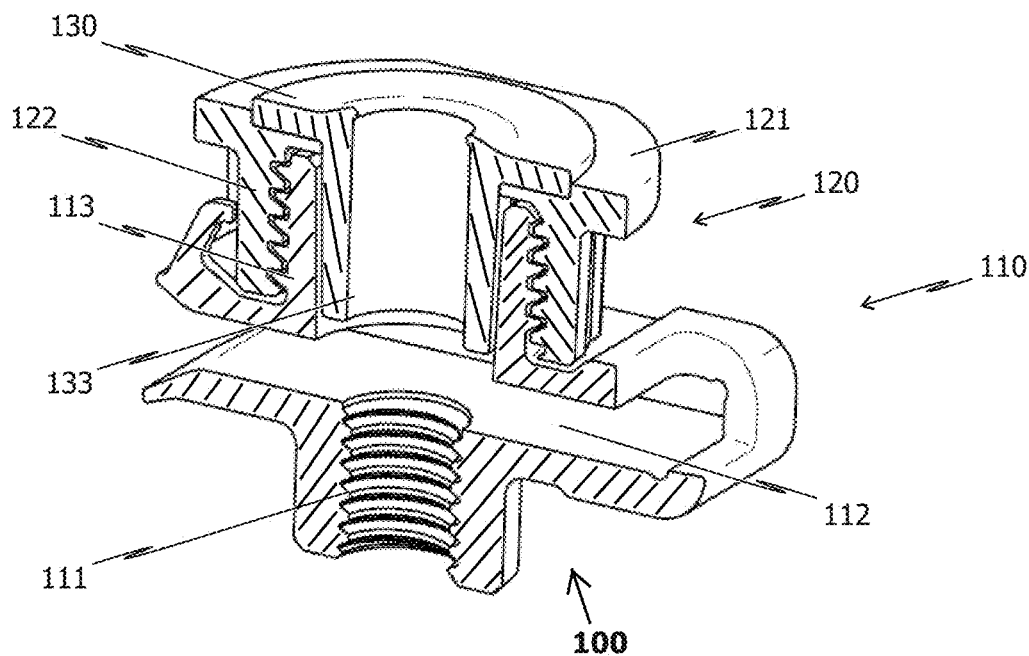
FIG. 1 shows a plan view of a holding element in accordance with the present invention.

In the following text, reference is made first of all to FIG. 1 which shows a plan view of a holding element 100 of the present invention.

The holding element 100 has a base region 110, a spacer element 120 and a sealing element 130.

The base region 110 has a first receiving and holding region 111 which is configured with a thread in the case of this embodiment. The thread serves to come into engagement with an elongate fixing element 200 (not shown) (for example, a screw).

Furthermore, the base region 110 has a second receiving and holding region 112. The latter is arranged above the first receiving and holding region 111 in FIG. 1 and is configured at least substantially as a clamp. The second receiving and holding region serves to receive and to hold a component 10 to be secured.

Moreover, the base region 110 has a first hollow cylindrical engagement region 113. The latter is arranged above the second receiving and holding region 112 in FIG. 1. More precisely, the first hollow cylindrical engagement region 113 is arranged opposite the first receiving and holding region 111, wherein the second receiving and holding region 112 is arranged between the two regions.

The first hollow cylindrical engagement region 113 has an external thread in the case of this embodiment of the invention.

The spacer element 120 is in engagement with the first hollow cylindrical engagement region 113 of the base region 110. More precisely, a second hollow cylindrical engagement region 122 of the spacer element 120 is in engagement with the first hollow cylindrical engagement region 113. Accordingly, the second hollow cylindrical engagement region 122 is an internal thread.

Moreover, the spacer element 120 has a spacer surface 121 which is arranged at one end of the second hollow cylindrical engagement region 122. The spacer surface 121 provides a radial contact surface.

The distance of the spacer element 120 and therefore the distance of the spacer surface 121 from the base region 110 can be adjusted by rotating of the spacer element 120 relative to the base region 110.

As can be seen in FIG. 1, the sealing element 130 is introduced at least in regions into the second hollow cylindrical engagement region 122.

Figure 2:
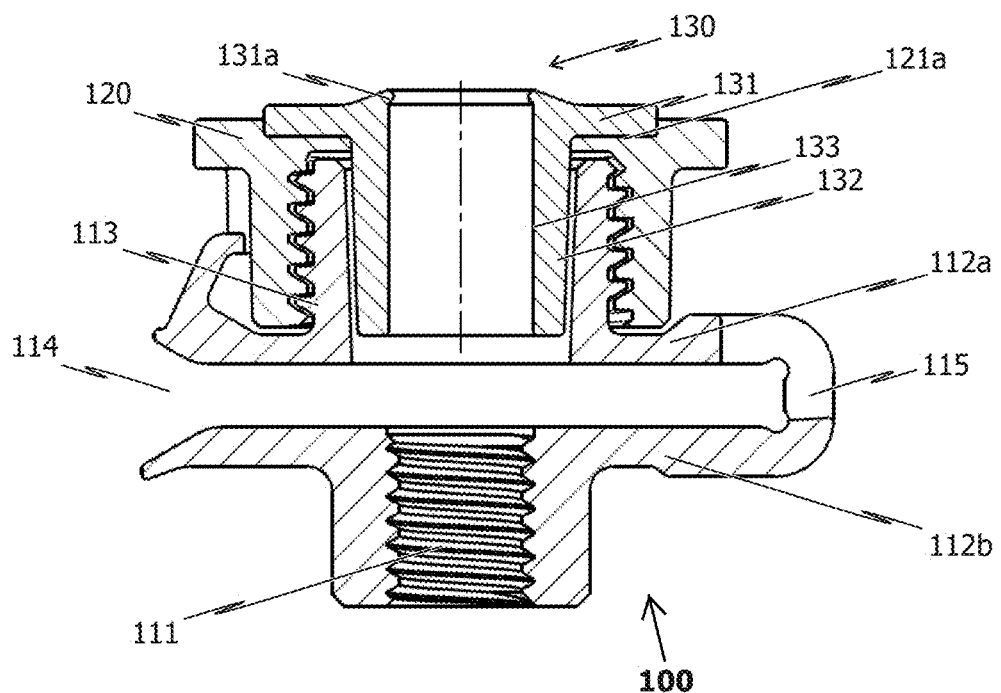
FIG. 2 shows a cross-sectional view of the holding element in accordance with the present invention.

As can be seen more clearly in FIG. 2, the sealing element 130 has an elongate insertion region 132 here which extends downward from a radial contact surface 131 into the second hollow cylindrical engagement region 122. The elongate insertion region 132 has an inner round casing surface 133 which bears against the fixing element all around when the fixing element is secured and thus seals against wet or dirt.

The radial contact surface 131 of the sealing element 130 radially surrounds the bore, in which the elongate insertion region 132 of the sealing element 130 is received, with the result that no wet or dirt can penetrate the component 10 to be secured here either.

As FIG. 2 shows, moreover, it can be advantageous if the spacer surface 121 of the spacer element 120 has an at least substantially circular recess 121a. Here, the at least substantially circular recess 121a is configured in such a way that it can receive the radial contact surface 131 of the sealing element 130.

Furthermore, it can be advantageous if the sealing element 130 or the radial contact surface 131 thereof has an axial overhang 131a which extends axially in a direction which is opposed to the elongate insertion region 132. That is to say, the axial overhang 131a extends from the radial contact surface 131 upward in FIG. 2. As can be seen later in conjunction with FIG. 4, the axial overhang 131a can further improve the sealing action.

As can be seen in FIG. 2, the base region 110 which is configured at least substantially as a clamp has a first leg 112a and a second leg 112b. Here, the first hollow cylindrical engagement region 113 is arranged on the first leg 112a, and the first receiving and holding region 111 is arranged on the second leg 112b. Here, the first receiving and holding region 111 and the first hollow cylindrical engagement region 113 are arranged with respect to one another in such a way that they share a common rotational axis. That is to say, they are arranged opposite one another, and the elongate fixing element 200 can be guided through them.

As can be seen in FIG. 2, moreover, the base region 110 or, more precisely, the second receiving and holding region 112 has an insertion region 114 on the left and a latching device 115 on the right. The component 10 to be secured can be introduced through the insertion region 114 into the second receiving and holding region 112. The latching device 115 serves to hold the component 10 to be secured reliably in the second receiving and holding region 112.

It can be seen in the case of the insertion region 114 that the distance from the first leg 112a to the second leg 112b decreases in FIG. 2 from the left to the right (that is to say in the insertion direction). This leads to an insertion aid being configured for the component 10 to be secured.

Figure 3:
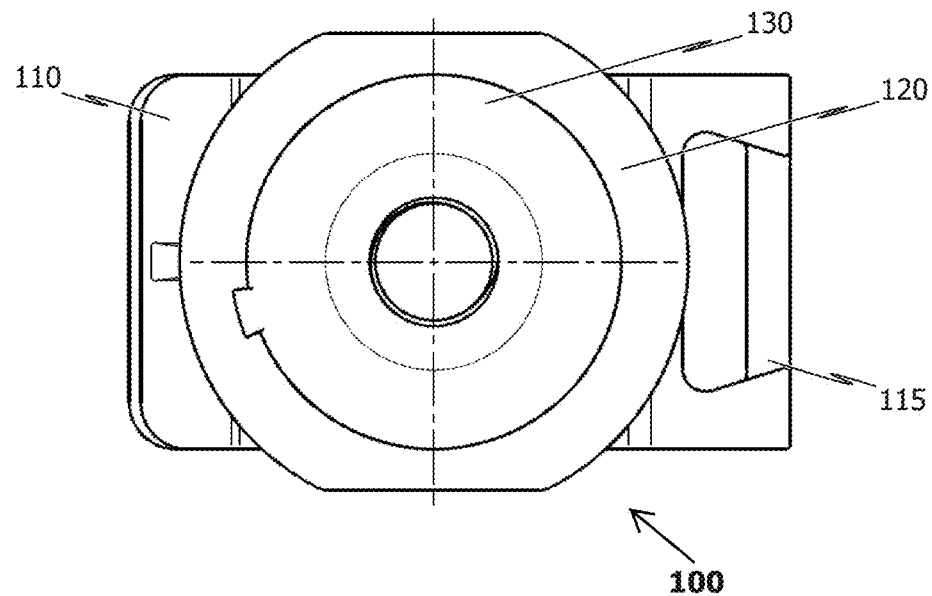
FIG. 3 shows a plan view of the holding element in accordance with the present invention from above.

FIG. 3 shows a plan view of the holding element 100 from above. It can be seen here that the base region 110 is of substantially rectangular configuration as viewed from above. The spacer surface 121 of the spacer element 120 is of at least substantially circular configuration as viewed from above. Here, however, parts of the outer periphery can be angled over. The radial contact surface 131 of the sealing element 130 is at least substantially circular as viewed from above.

Figure 4:
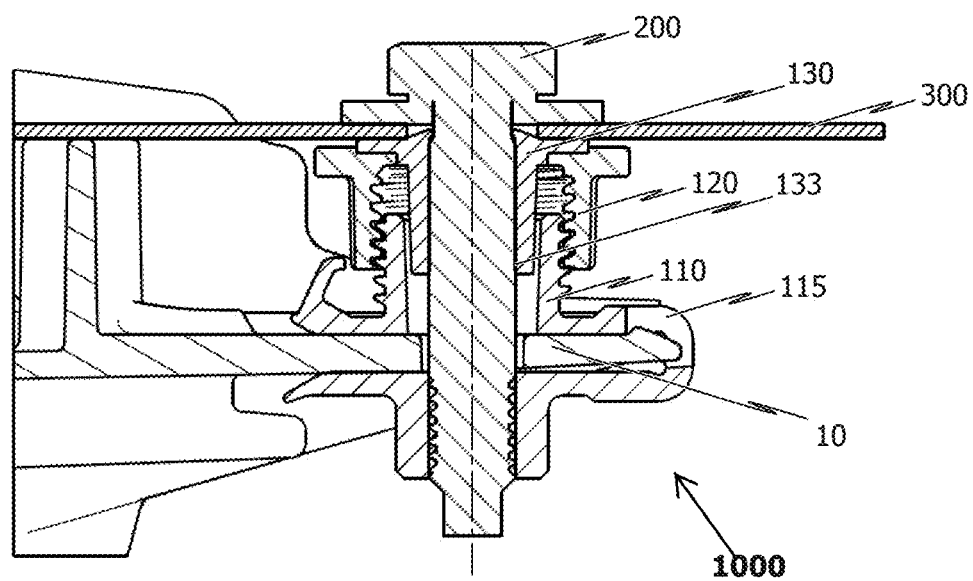
FIG. 4 shows a cross-sectional view of the holding system according to the invention with a holding element in accordance with the present invention.

FIG. 4 shows a holding system 1000 which holds a component 10 to be secured on a part 300 of a vehicle. In particular, the component 10 to be secured is a rear light, and the part 300 of the vehicle is a vehicle body part of the vehicle.

As can be seen in FIG. 4, the rear light or an at least substantially two-dimensional securing region of the rear light is received in the second receiving and holding region 112 of the base region 100. Here, the component 10 to be secured, that is to say the rear light, has a bore, with which the holding element 100 is oriented in a fitting manner in the assembly position. In this context, "fitting" means that it is possible to plug the fixing element 200 through the sealing element 130, the spacer element 120, the base region 110, the bore in the rear light, and the bore in the part 300 of the vehicle. That is to say, the bore in the component 10 to be secured, the bore in the part 300 of the vehicle, the sealing element 130, the spacer element 120, the first receiving and holding region 111 and the first hollow cylindrical engagement region 113 of the base region 110 have a common rotational axis.

Here, the inner diameter of the sealing element (inner round casing surface) is smaller than the outer diameter of the elongate fixing element. The sealing element therefore bears securely all around on the outside against the elongate fixing element, with the result that a reliable seal against wet or dirt is made possible.

As can likewise be seen in FIG. 4, an outer region of the element 10 to be secured comes into engagement with the latching device 115. Here, the latching device 115 is a recess, and the outer region of the component 10 to be secured is an overhang. It is possible to overcome distances of different magnitude between the part 300 of the vehicle and the component 10 to be secured by way of the spacer element 120. That is to say, tolerances can be compensated for by way of the spacer element 120.

The sealing element 130 or, in particular, the radial contact surface 131 thereof is pressed upward (in the direction of the part 300) by the spacer surface 121 of the spacer element 120 in FIG. 4. The radial contact surface 131 of the sealing element 130 lies radially around the bore in the part 300 of the vehicle. Furthermore, the radial contact surface 131 is clamped between the spacer surface 121 and the part 300 of the vehicle. Here, the axial overhang 131a of the radial contact surface 131 reaches into the bore of the part 300.

The spacer element 120 is preferably screwed out in the case of a screwing operation by way of a left-handed thread by means of a frictionally locking connection by way of the fixing element 200 with respect to the sealing element 130, to such an extent until the spacer element 120 bears against the part 300 of the vehicle. A blocked situation occurs here, and the fixing element 200 (for example, screw) is locked, that is to say tightened. Therefore, in one screwing operation, the tolerance compensation takes place in the screwing axis between the receiving and holding region 111 and the spacer element 120, and finally the screwing torque/screwing connection takes place between the component 10 to be secured and the part 300 of the vehicle with a final sealing function.

Overall, a satisfactory seal can thus be achieved at the point of the bore in the part (300) by way of the holding system 1000.

LIST OF DESIGNATIONS

Component to be secured 10
Holding element 100
Base region 110
First receiving and holding region 111
Second receiving and holding region 112
First hollow cylindrical engagement region 113
Insertion region 114
Latching device 115
Spacer element 120
Spacer surface 121
Circular recess 121a
Second hollow cylindrical engagement region 122
Sealing element 130
Contact surface 131
Axial overhang 131a
Elongate insertion region 132
Casing surface 133
Elongate fixing element 200
Part of a vehicle 300
Holding system 1000

The invention claimed is:

1. A holding element for holding a component to be secured on a part of a vehicle, wherein the holding element comprises the following:
a base region with a first receiving and holding region for an elongate fixing element, a second receiving and holding region for a component to be secured, and a first hollow cylindrical engagement region;
a spacer element with a spacer surface and a second hollow cylindrical engagement region which is in engagement with the first hollow cylindrical engagement region of the base region; and
a sealing element which consists of a softer material than the spacer element, wherein the sealing element has a hollow, elongate insertion region which is inserted in or formed on the first hollow cylindrical engagement region of the base region, wherein the insertion region has an inner round casing surface which is configured to bear against the elongate fixing element all around when the fixing element is secured in the holding element and thus seal against wet or dirt,
wherein a distance from the spacer surface to the base region is adjustable; and
wherein the inner round casing surface is continuously round about the insertion region of the sealing element.

2. The holding element of claim 1, wherein the first hollow cylindrical engagement region comprises an elongate opening defined by a surrounding surface that lacks threads and extends to the second receiving and holding region.

3. A holding element for holding a component to be secured on a part of a vehicle, comprising:
a base region with a first receiving and holding region comprising an opening for an elongate fixing element, a second receiving and holding region for a component to be secured, and a first hollow cylindrical engagement region comprising an opening, wherein the second receiving and holding region is formed by a space that (i) is located between the first receiving and holding region and the first hollow cylindrical engagement region and (ii) separates the opening of the first receiving and holding region from the opening of the first hollow cylindrical engagement region;
a spacer element with a spacer surface and a second hollow cylindrical engagement region which is in engagement with the first hollow cylindrical engagement region of the base region; and
a sealing element having a hollow, elongate insertion region which is inserted in or formed on the first hollow cylindrical engagement region of the base region, wherein the insertion region has an inner round casing surface which is configured to bear against the elongate fixing element all around when the fixing element is secured in the holding element and thus seal against wet or dirt, wherein a distance from the spacer surface to the base region is adjustable; and wherein the inner round casing surface is continuously round about the insertion region of the sealing element.

4. A holding element for holding a component to be secured on a part of a vehicle, wherein the holding element comprises the following:
   a base region with a first receiving and holding region comprising a wall surrounding an elongate opening for an elongate fixing element, a second receiving and holding region for a component to be secured, and a first hollow cylindrical engagement region comprising a wall surrounding an elongate opening;
   a spacer element with a spacer surface and a second hollow cylindrical engagement region which is in engagement with the first hollow cylindrical engagement region of the base region; and
   a sealing element which consists of a softer material than the spacer element, wherein the sealing element has a hollow, elongate insertion region which is inserted in or formed on the elongate opening of the first hollow cylindrical engagement region of the base region, wherein the insertion region has an inner round casing surface which is configured to bear against the elongate fixing element all around when the fixing element is secured in the holding element and thus seal against wet or dirt,
   wherein a distance from the spacer surface to the base region is adjustable;
   wherein the elongate opening of the first receiving and holding region is axially aligned with the elongate opening of the first hollow cylindrical engagement region, and wherein at least part of the second receiving and holding region is formed by a space that axially separates the elongate opening of the first receiving and holding region from the elongate opening of the first hollow cylindrical engagement region; and
   wherein the inner round casing surface is continuously round about the insertion region of the sealing element.

5. The holding element for holding a component to be secured as claimed in claim 1,
   wherein the elongate opening of the first receiving and holding region has an internal thread, wherein an outer thread radius is defined by a thread base of the internal thread, wherein the inner round casing surface has an inner diameter which is smaller than the outer thread radius.

6. The holding element for holding a component to be secured as claimed in claim 4,
   wherein the sealing element has an axial overhang at an inner periphery of a radial contact surface which rests at least in regions on the spacer surface.

7. The holding element for holding a component to be secured as claimed in claim 6,
   wherein the spacer surface has a at least substantially circular recess in which the radial contact surface of the sealing element is received.

8. The holding element for holding a component to be secured as claimed in claim 4,
   wherein the base region, the spacer element and the sealing element are made of plastic, and wherein the sealing element is made of a thermoplastic elastomer.

9. The holding element for holding a component to be secured as claimed in claim 4,
   wherein the second receiving and holding region is configured at least substantially as a clamp with a first leg and a second leg and has a main extension direction, and the space is located between the first leg and the second leg.

10. The holding element for holding a component to be secured as claimed in claim 9,
    wherein the first hollow cylindrical engagement region extends from the first leg orthogonally to the main extension direction of the second receiving and holding region, and wherein the first receiving and holding region extends orthogonally from the second leg.

11. The holding element for holding a component to be secured as claimed in claim 10,
    wherein the first hollow cylindrical engagement region and the first receiving and holding region are arranged relative to each other such that an elongate fixing element can be introduced through the sealing element, the spacer element and the base region up to the first receiving and holding region.

12. The holding element for holding a component to be secured as claimed in claim 9,
    wherein the second receiving and holding region has an insertion region and a latching device.

13. The holding element for holding a component to be secured as claimed in claim 12,
    wherein the latching device and the insertion region are arranged at opposite ends in the main extension direction of the second receiving and holding region.

14. The holding element for holding a component to be secured as claimed in claim 12,
    wherein the insertion region comprises an insertion aid, and wherein the latching device comprises a recess.

15. The holding element for holding a component to be secured as claimed in claim 4,
    wherein the second hollow cylindrical engagement region of the spacer element has an internal thread, and wherein the first hollow cylindrical engagement region of the base region has an external thread.

16. The holding element for holding a component to be secured as claimed in claim 15,
    wherein the distance from the spacer surface to the base region is adjusted by rotating the spacer element in the first hollow cylindrical engagement region of the base region.

17. The holding element of claim 4, wherein the first receiving and holding region extends in a first direction away from the second receiving and holding region and the first hollow cylindrical engagement region extends in a second direction away from the second receiving and holding region, the second direction opposite the first direction.

18. The holding element of claim 4, wherein the first receiving and holding region is located at a first side of the second receiving and holding region and the first hollow cylindrical engagement region is located at a second side of the second receiving and holding region.

19. A holding system for holding a component to be secured on a part of a vehicle,
    wherein the holding system comprises the following:
    a holding element as claimed in claim 4; and
    an elongate fixing element which is inserted through the sealing element, the spacer element and the base region and is in engagement with the first receiving and holding region; and
    wherein the inner round casing surface has an inner diameter which is smaller than an outer diameter of the elongate fixing element.

* * * * *